United States Patent
Daniel et al.

(10) Patent No.: US 11,868,415 B1
(45) Date of Patent: Jan. 9, 2024

(54) INFERENTIAL NEWSFEED ARCHITECTURE SYSTEM AND METHOD

(71) Applicant: Lightweaver, LLC, Bethesda, MD (US)

(72) Inventors: Peter E. Daniel, Centreville, VA (US); Randa Z. Daniel, Centreville, VA (US); Vidul Krishna Kotwal, Herndon, VA (US); Hardikkumar Jayendrakumar Chandi, Sterling, VA (US); Paresh Khushiram Bijvani, Herndon, VA (US); Ann Fritz Hackett, McLean, VA (US); Charles Gregg Petersmeyer, Bethesda, MD (US)

(73) Assignee: Lightweaver, LLC, Bethesda, MD (US)

( * ) Notice: Subject to any disclaimer, the term of this patent is extended or adjusted under 35 U.S.C. 154(b) by 141 days.

(21) Appl. No.: 17/470,199

(22) Filed: Sep. 9, 2021

Related U.S. Application Data

(60) Provisional application No. 63/094,495, filed on Oct. 21, 2020.

(51) Int. Cl.
| | |
|---|---|
| *G06F 16/9535* | (2019.01) |
| *G06F 16/2455* | (2019.01) |
| *G06F 16/2458* | (2019.01) |
| *G06F 16/9538* | (2019.01) |

(52) U.S. Cl.
CPC ...... *G06F 16/9535* (2019.01); *G06F 16/2465* (2019.01); *G06F 16/24552* (2019.01); *G06F 16/9538* (2019.01)

(58) Field of Classification Search
CPC .......... G06F 16/9535; G06F 16/24552; G06F 16/2465; G06F 16/9538
See application file for complete search history.

(56) References Cited

U.S. PATENT DOCUMENTS

| | | | |
|---|---|---|---|
| 2016/0110465 A1* | 4/2016 | Olsen | G06F 3/04842 715/752 |
| 2018/0020038 A1* | 1/2018 | Penov | H04L 67/53 |
| 2019/0310746 A1* | 10/2019 | Lange | G06Q 30/02 |

\* cited by examiner

*Primary Examiner* — Mariela Reyes
*Assistant Examiner* — Fatima P Mina
(74) *Attorney, Agent, or Firm* — Richard L. Sampson; Davis, Malm, D'Agostine, P.C.

(57) ABSTRACT

A system and method for generating and publishing inferential newsfeeds captures actively and passively provided user data elements which are processed into user facts. A Cache Management Module maintains updated cached copies of rules and execution plans. The cached copies of rules and execution plans are applied to the user facts, to inferentially generate newsfeed posts. An Inferential Data Mining Module runs each execution plan in a multi-threaded process for each user, and processes each rule within the context of the execution plan to generate the newsfeed posts. A Newsfeed Generation Module applies newsfeed templates to format the newsfeeds for various platforms. The Inferential Data Mining Module mines the Data Store for a determination of which user facts should be used to create the newsfeed posts, and of which users should be designated as subscribers to the newsfeed posts, said determination taking place independently of individual users' direct actions.

19 Claims, 12 Drawing Sheets

💡 People in the company who want to learn more about Quality Assurance  ⌄ ─ 88A 💬 Comment

FIG. 3A

3 | Before your upcoming meeting: Customer Success Call ...  ⌄ ─ 88B

Preview skills, experiences, interests, similarities, ways we work best, and other capabilities of an individual (click picture) or the group as a whole.

| Brian Moore | Chris Brown | Willam Taylor | Jule Fransis | Michael Stev... |

FIG. 3B

Ashley Clark has joined the Customer Success team in Reston  ⌄ ─ 88C Please welcome Ashley!

Job Title: Director of Customer Support
Department: Customer Success
Office: Reston
Start Date: May 5th
Learn more...

👍 Like this!  💬 Comment  ↗ Share

FIG. 3C

Rachael Rose, Deborah Hill, Edward Johnson and 2 others also commented on *The biggest adjustment in becoming a parent* — 88D

Rachael Rose
"Less sleep!"

Deborah Hill
"Learning to let my kids fall"

Edward Johnson
"Realizing you are not in control"

Gregg Abbott
"Smaller feeling home"

Florance Banks
"Constant anxiety and feeling of protectiveness"

Like this! | Comment | Share

FIG. 3D

Brian Moore was recognized by Eric Box for *Courage* — 88E

Brian's analytical rigor was important to identifying the root cause behind the recent compliance breakdown. He worked with persistence and patience, took time to understand others' viewpoints and was willing to constructively challenge others' assumptions.

Brian Moore

Like this! | Comment | Share

FIG. 3E

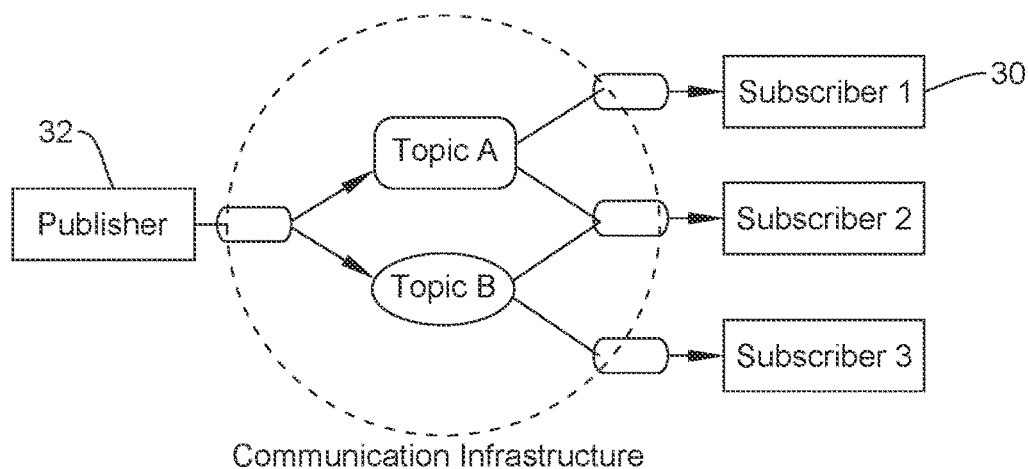

(Prior Art)
FIG. 4

| Source Properties | |
|---|---|
| Source* | Someone is recognised ▽ |
| Match With* | Company Tag ▽ |
| Proximity* | Departments ▽ |
| Feed Mode | Single Celebration ▽ |
| Display Template* | Celeb Single View ▽ |
| Hold Minutes* | 0 |
| Look Back Days* | 4 |
| No Of Post Limit* | 2 |

FIG. 8

| Source Properties | |
|---|---|
| Source* | Someone answered What I care about ▽ |
| Match With* | Care About ▽ |
| Proximity* | Office Locations ▽ |
| Feed Mode | Aggregated - Helping Children Succeed ▽ |
| Display Template* | What i care abt-aggregated-helping children succeed ▽ |
| Hold Minutes* | 1 |
| Look Back Days* | 7 |
| No Of Post Limit* | 1 |

FIG. 9

| | |
|---|---|
| Execution Plan Name* | RD - Plan 1 |
| Description | |
| Frequency* | Continuous ▽ |
| Mode* | Random_one ▽ |

Add Rules

Rules Order

- = RD - Care About - Single — (YES○) 🗑
- = RD - Someone creates a post — (YES○) 🗑
- = RD - Who I am - Match on Question — (YES○) 🗑
- = RD - Ways we work best - Time of work — (YES○) 🗑
- = RD - Skills - match - Aggregated — (YES○) 🗑
- = RD - Ways we work best - people list — (YES○) 🗑
- = RD - Skills - no match - Aggregated — (YES○) 🗑
- = S - Someone answered what I care about (no match) — (YES○) 🗑
- = A - Someone answered what I care about (matches) — (YES○) 🗑
- = S - Someone answered what makes a difference (no match) — (YES○) 🗑
- = A - Someone wants to learn about a topic (asked about the same topic) — (YES○) 🗑

FIG. 10

| | |
|---|---|
| Source* | Someone answered Who Am I questions ▽ |
| Match With* | Question ▽ |
| Proximity* | --Select-- |
| | None |
| | Question |
| Feed Mode | Choice |
| | Answer |
| Display Template* | Who Am I Question - A ▽ |
| Hold Minutes* | 0 |
| Look Back Days* | 1000 |
| No Of Post Limit* | 3 |

FIG. 11

| | |
|---|---|
| Source* | Someone answered Who Am I questions ▽ |
| Match With* | Question ▽ |
| Proximity* | Company ▽ |
| Feed Mode | Group Of People ▽ |
| Display Template* | --Select-- |
| | One Person |
| Hold Minutes* | Group Of People |
| | 0 |
| Look Back Days* | 1000 |
| No Of Post Limit* | 3 |

| | |
|---|---|
| Source* | Someone answered Who Am I questions ▽ |
| Match With* | Question ▽ |
| Proximity* | Company ▽ |
| Feed Mode | Group Of People ▽ |
| Display Template* | Who Am I Question - A ▽ |
| | --Select Template-- |
| Hold Minutes* | Who Am I Question - A |
| | Who Am I-Multiple Questions |
| Look Back Days* | 1000 |
| No Of Post Limit* | 3 |

| | |
|---|---|
| Source* | Someone answered Ways I Work Best ▽ |
| Match With* | None ▽ |
| Proximity* | Company ▽ |
| Feed Mode | Group Of People ▽ |
| Display Template* | Ways I Work Best : Choice - People list ▽ |
| | --Select Template-- |
| Hold Minutes* | Ways I Work Best : Choice - People list |
| | Ways I Work Best - Doughnut |
| Look Back Days* | 7 |
| No Of Post Limit* | 1 |

| | |
|---|---|
| Source* | Someone answered Who Am I questions ▽ |
| Match With* | Question ▽ |
| Proximity* | Company ▽ |
| | --Select Proximity-- |
| | Company |
| Feed Mode | Target Tags |
| | Target Tags |
| Display Template* | Colleagues |
| | Groups |
| Hold Minutes* | Office Locations |
| | Departments |
| Look Back Days* | My Views/Meetings |
| No Of Post Limit* | 3 |

INFERENTIAL NEWSFEED ARCHITECTURE SYSTEM AND METHOD

BACKGROUND

Related Application

This application claims the benefit of U.S. Provisional Patent Application Ser. No. 63/094,495, entitled Inferential Newsfeed Architecture System and Method, filed on Oct. 21, 2020, the contents of which are incorporated herein by reference in their entirety for all purposes.

Technical Field

This invention relates to newsfeed systems, and more particularly to an automated system for inferentially generating newsfeeds that are customized to individual users.

BACKGROUND INFORMATION

Conventional newsfeed architectures are based on a publisher/subscriber architecture. This publisher/subscriber architecture relies heavily on users posting content and other users subscribing or 'following' their contacts' posts. For example, if user A has an existing relationship with user B, that relationship may be represented as a subscription where user B subscribes to user A. This architecture provides an asynchronous messaging system in which user A (the publisher) pushes a message to all subscribing users B. Drawbacks of this approach include a dependency on pre-existing relationships among users, and on the publisher generating content (i.e., posts).

A need exists for a system and method that addresses these drawbacks.

SUMMARY

In one aspect of the present invention, a system for generating and publishing relevant newsfeeds to unsubscribed system users includes a processor and a memory configured to store modules executable by the processor, the modules include a Web Service Module configured to capture actively and passively provided user data elements from a plurality of sources, and to add the user data elements to a data queue. A Data Queue Manager Module is configured to read the data queue and to process each of the user data elements to generate a plurality of user facts. A Data Store is configured to store the plurality of user facts, rules, and execution plans. A Cache Management Module is configured to detect when changes are made to the rules and to the execution plans, and to store updated cached copies of the rules and the execution plans, wherein the updated cached copies are accessible by an Inferential Data Mining Module independently of the Data Store to facilitate efficient multi-threaded processing for each of a plurality of users. The Inferential Data Mining Module is configured to access and apply the updated cached copies of the execution plans and rules to the user facts, to inferentially generate newsfeed posts by identifying commonalities among the plurality of users, wherein the Data Mining Module is configured to run each execution plan in a multi-threaded process for each user, and to process each rule within the context of the execution plan to generate the newsfeed posts. A Newsfeed Generation Module is configured to apply one or more newsfeed templates for various platforms to each newsfeed post, to generate newsfeeds that are formatted for the various platforms. The Inferential Data Mining Module mines the Data Store for a determination of which user facts should be used to create the newsfeed posts, and of which users should be designated as subscribers to the newsfeed posts, said determination taking place independently of individual users' direct actions so that the newsfeed posts and subscribers thereto are inferentially defined by the Data Mining Module based on relationships between users and/or inferences obtained from the user facts.

In another aspect of the present invention, a method for generating and publishing relevant newsfeeds to unsubscribed system users, includes capturing, with a Web Service Module actively and passively provided user data elements from a plurality of sources, and adding the user data elements to a data queue. The method further includes reading and processing, with a Data Queue Manager Module, the data queue and each of the user data elements to generate a plurality of user facts; storing, with a Data Store, the plurality of user facts, rules, and execution plans; and detecting, with a Cache Management Module, when changes are made to the rules and to the execution plans, and storing updated cached copies of the rules and the execution plans, wherein the updated cached copies are accessible by an Inferential Data Mining Module independently of the Data Store to facilitate efficient multi-threaded processing for each of a plurality of users. The Inferential Data Mining Module accesses and applies the updated cached copies of the execution plans and rules to the user facts, to inferentially generate newsfeed posts by identifying commonalities among the plurality of users, wherein the Data Mining Module is configured to run each execution plan in a multi-threaded process for each user, and to process each rule within the context of the execution plan to generate the newsfeed posts. A Newsfeed Generation Module applies one or more newsfeed templates for various platforms to each newsfeed post, to generate newsfeeds for the various platforms, wherein the modules are processed by one or more computer processors, and wherein the Inferential Data Mining Module mines the Data Store for a determination of which user facts should be used to create the newsfeed posts, and of which users should be designated as subscribers to the newsfeed posts, said determination taking place independently of individual users' direct actions so that the newsfeed posts and subscribers thereto are inferentially defined by the Data Mining Module based on relationships between users and/or inferences obtained from the user facts.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 3A is an image displayed to users by embodiments of the present invention;

FIG. 3B is an image displayed to users by embodiments of the present invention;

FIG. 3C is an image displayed to users by embodiments of the present invention;

FIG. 3D is an image displayed to users by embodiments of the present invention;

FIG. 3E is an image displayed to users by embodiments of the present invention;

FIG. 4 is a block diagram of a newsfeed system of the prior art;

FIG. 8 is an image displayed to administrators of embodiments of the present invention;

FIG. 9 is an image displayed to administrators of embodiments of the present invention;

FIG. 10 is an image displayed to administrators of embodiments of the present invention;

FIG. 11 is an image displayed to administrators of embodiments of the present invention;

FIG. 12 is an image displayed to administrators of embodiments of the present invention;

FIG. 13 is an image displayed to administrators of embodiments of the present invention;

FIG. 14 is an image displayed to administrators of embodiments of the present invention;

FIG. 15 is an image displayed to administrators of embodiments of the present invention.

DETAILED DESCRIPTION

Figure 1:
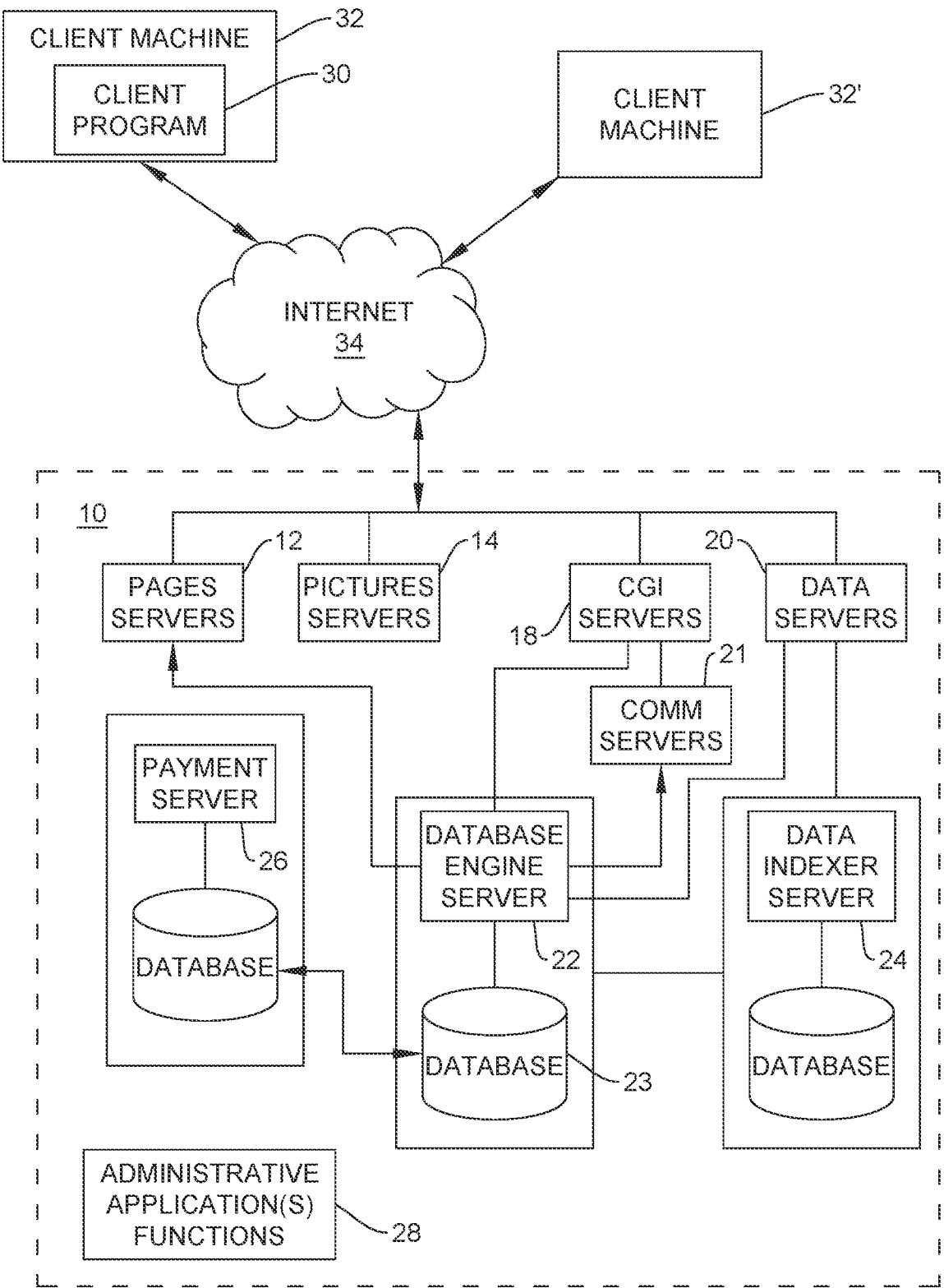
FIG. 1 is a block diagram of a system embodying aspects of the present invention.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. For example, reference to "an analyzer" includes a plurality of such analyzers. In another example, reference to "an analysis" includes a plurality of such analyses.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

As used herein, the terms "computer" and "end-user device" are meant to encompass a workstation, personal computer, personal digital assistant (PDA), wireless telephone, or any other suitable computing device including a processor, a computer readable medium upon which computer readable program code (including instructions and/or data) may be disposed, and a user interface. Terms such as "server", "application", "engine", "component", "module", "control components/devices", and the like are intended to refer to a computer-related entity, including hardware or a combination of hardware and, software. For example, an engine and/or module may be, but is not limited to being: a process running on a processor; a processor including an object, an executable, a thread of execution, and/or program; and a computer. Moreover, the various computer-related entities may be localized on one computer and/or distributed between two or more computers.

Programming Languages

The system and method embodying the present invention can be programmed in any suitable language and technology, such as, but not limited to: C, C++; Visual Basic; Java; VBScript; Jscript; Node.js; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400, as well as big data and NoSQL technologies, such as, but not limited to, Hadoop or Microsoft Azure.

Referring now to the Figures, embodiments of the present invention will be described. FIG. 1 is a block diagram illustrating an exemplary network-based inferential newsfeed facility 10. The inferential newsfeed facility 10 includes one or more of a number of types of front-end servers, namely page servers 12 that deliver web pages, picture servers 14 that dynamically deliver images to be displayed within web pages, CGI (Common Gateway Interface) servers 18 that provide an intelligent interface to the back-end of facility 10, and client data servers 20 that handle client data feeds to the facility 10. Communication servers 21 provide, inter alia, automated electronic communications (e.g., via a client app residing on the user's client computer, and/or by email, and the like) to users (clients) of the facility 10. The back-end servers may include a database engine server 22, a client data index server 24 and optionally, a payment (e.g., credit card and/or subscription) database server 26, each of which may maintain and facilitate access to a respective database. Facility 10 may also include an administrative application server 28 configured to provide various administrative functions.

The network-based inferential newsfeed facility 10 may be accessed by a client program 30, such as a mobile application and/or browser that executes on a client machine 32 and accesses the facility 10 via a network such as, for example, the Internet 34. Other examples of networks that a client may utilize to access the inferential newsfeed facility 10 include a wide area network (WAN), a local area network (LAN), and/or a wireless network (e.g., a cellular network). It should be recognized that any number of client machines 32, 32', etc., may be communicably coupled to the inferential newsfeed facility 10.

Figure 2:
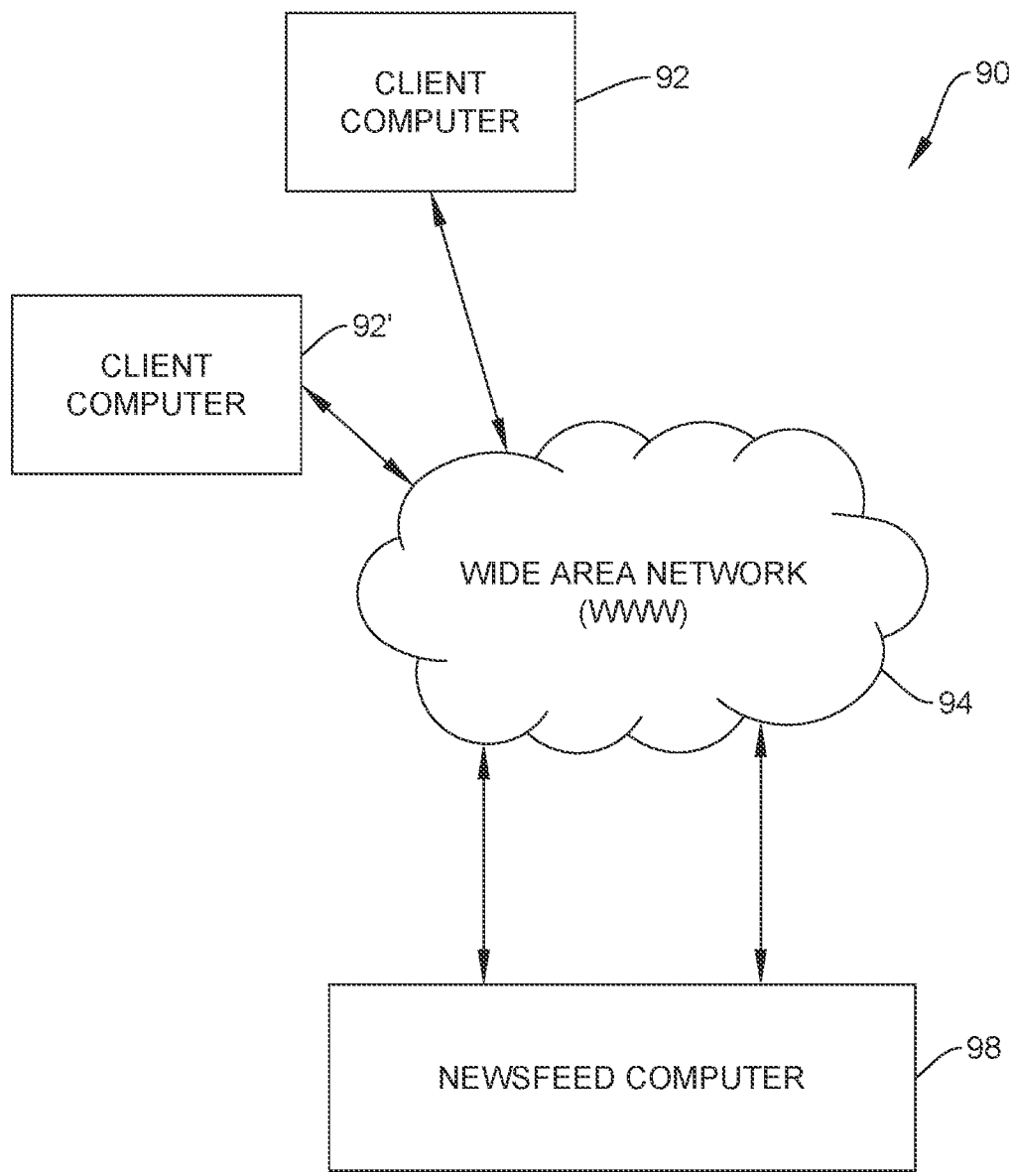
FIG. 2 is a block diagram of a simplified system embodying aspects of the present invention.

FIG. 2 is a simplified block diagram of a system 90 for generating inferential newsfeeds in accordance with an exemplary embodiment of the present invention. In this embodiment, a client computer 92 is coupled to an inferential newsfeed computer 98 via a communications network (e.g. a wide area network) 94. The client computer 92, 92', etc., represents a device that allows a user to interact with the inferential newsfeed computer 98. In one embodiment, the client computer 92 presents to the user a newsfeed interface for sending data and receiving newsfeeds associated with the inferential newsfeed computer 98.

The inferential newsfeed computer 98, which supports an inferential newsfeed facility such as shown at 10 of FIG. 1, handles transactions between various participants of the facility 10 including the user of the client computer 92. In one embodiment, the computer 98 may initially receive the personal information of the participant from the client computer 92, and generate a subscription result which determines whether, and to what extent, the user is granted access to the facility 10. The inferential newsfeed computer then facilitates the generation of custom newsfeeds in accordance with various user interfaces presented by the computer 98, via the client computer 92, to the user.

Initially, it is noted that embodiments of the invention rely on asking users to self-provision by asking them to fill out a profile when they first register, which profile is then updated as needed. These embodiments have been successful at getting a relatively high percentage of users to complete their profiles, i.e., >70%. An aspect of the invention was the recognition by the present inventors, that it would be desirable to create a system and method that was not reliant on the requiring users to purposefully look up and view their colleagues' completed profiles. The present inventors further realized that in order to make their system more responsive and alive, they needed to architect a streaming newsfeed that can display bite-size information about a user's colleague using a methodology that involves the following four elements:

Triggers (both internal and external);
Actions (behavior done in anticipation of a reward);
Variable Reward (creating an unpredictable reward); and
Investment (user input).

These embodiments involve these four elements by generating relatively small pieces (hereinafter, "snippets", "items", or "posts") of information to display in its newsfeed. These are unpredictable snippets of information that are generated based upon (e.g., recipient) users' profiles (e.g., skills, what I want to learn/be asked about, what I like to do, my recognitions, etc.) and/or from users' interaction with the system, as will be discussed in greater detail hereinbelow. According to the teachings herein, each post is configured to be relevant to the (recipient) user, based on their own selections, their proximity to other affected/relevant users, and/or their preferences. In particular embodiments, some of the posts represent an aggregated view based on factors such as the user's department, office location or groups. It should be recognized that unlike conventional newsfeed systems, the items in the newsfeed are not simply other users' posts. Instead the instant embodiments utilize a rule-based, e.g., artificial intelligence (AI) engine 44, 44', to mine the data in the system and create very specific content for each user. Based on answers to questions the users have provided as part of the aforementioned profile creation, the instant system infers, prioritizes and assembles content in ways that are configured to be valuable and interesting to the (recipient) user, and to provide insights while simultaneously factoring in the micro-universes (e.g. particular teams, other groups, departments, functional areas) that are valuable to the user.

As shown in FIGS. 3A-3E, some examples of the newsfeed posts 88 generated by these embodiments include a listing of people interested in learning about one of the user's skills, as shown at 88A in FIG. 3A, a listing of registered attendees of one of the user's upcoming events (88B, FIG. 3B), a new member of the user's group (88C, FIG. 3C), a list of commenters on a subject of interest to the user (88D, FIG. 3D), and recognition of an attribute of interest to the user (88E, FIG. 3E).

An aspect of the present invention was recognition by the inventors that conventional newsfeed architectures are based on a publisher/subscriber architecture, as shown in FIG. 4. This conventional publisher/subscriber architecture relies on users posting content and other users having subscription to their contact's posts. For example, if user A has an existing relationship with user B, that relationship is represented as a subscription where user B is a subscriber 30 of user A (publisher) 32. This architecture provides an asynchronous messaging system that may also enable users to further tailor their newsfeeds to only those of their selected publishers 32 that fall within specific channels (e.g., topics or categories) 34. The publisher 32 thus pushes a post to a channel or topic and all users that subscribe to that channel/topic receive that message without having direct connection to the publisher.

The instant inventors have recognized that this conventional architecture is generally inapplicable to embodiments of the present invention for at least two reasons:

1) Users of the instant embodiments do not establish their own relationships, e.g., they do not 'subscribe' or 'follow' other users. Rather, the system identifies relationships between users based on matching user data elements captured from a variety of sources. In particular embodiments, the relationships are defined by the intersection of their proximity to other affected/relevant users, and data driven insights about individual users.

2) The users of these embodiments are not the publishers of the posts. The publisher is the system itself, which performs sophisticated data mining and use a rules-based AI engine to generate posts that are specific and customized to each user in the system, based on a number of multi-dimensional factors. The system infers what would be valuable to the user based on the entire set of data users have provided, rather than the user deciding based on their limited visibility into how other users and their content might relate to them. The tailored newsfeed content for each user is inferred from answers that a particular user and other users have provided and/or from data otherwise captured by the system. The system creates enhanced value for users by mining data, revealing relevant information and inferring value based on (a) the specific content a user has provided and/or otherwise captured by the system, and how it relates to content associated with other users, and (b) user relationships with one another (e.g. their micro-universes).

As mentioned above, it should be noted that conventional social networking websites/applications enable users to 'follow' other users, while conventional dating websites/applications and the like effectively provide users with search results. These conventional social networking approaches also rely on sending advertisements to users based on users' search queries. As such, these conventional approaches should be viewed as giving users what they've explicitly asked for, either directly (e.g., by following other users) or indirectly (e.g., results of searching for individuals to date, or of products to purchase). More specifically, conventional social media approaches provide (a) feeds/content in response to explicit user requests to 'follow'/'subscribe' to feeds from particular individuals and/or on particular topics, (b) search results in response to explicit requests, e.g., for individuals to date, or (c) advertisements for products/services the users have affirmatively searched for. Embodiments of the present invention, on the other hand, create/publish 'newsfeeds' which are not created on the basis of explicit user requests, but rather, are created using inferences that the system/publisher has made that do not bear an explicit relationship to user requests. The instant embodiments reveal/infer topics and connections, unlike conventional social media that requires users to select topics and affirmatively make connections. The instant embodiments thus do not provide a conventional asynchronous, i.e., hierarchical, communication structure in which some users play the role of 'publisher' while other users play the role of 'subscriber/follower'. Rather, these embodiments provide a non-hierarchical (hierarchically flat) communication structure in which the users are all similarly situated (e.g., as subscriber/follower), with the system itself playing the role of publisher.

Architecture

Figure 5:
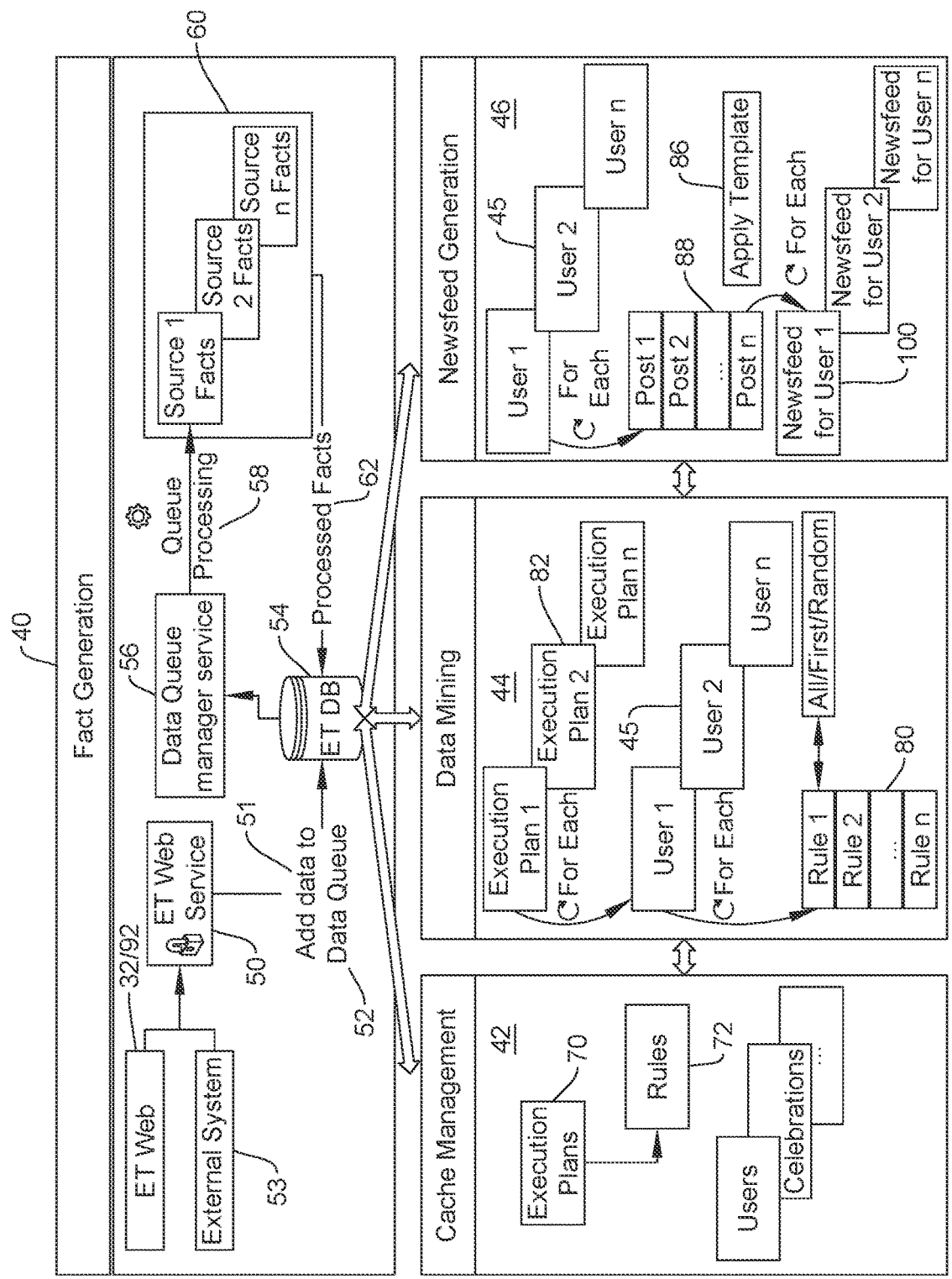
FIG. 5 is a functional block diagram of one embodiment of a newsfeed system of the present invention.

Turning now to FIG. 5, the instant embodiments include four primary components. These components include Fact Generation Engine 40, Cache Management Engine 42, Inferential Data Mining Engine 44 and Newsfeed Generation Engine 46. As shown, Fact Generation Engine 40 includes a Web Service Module 50 configured to capture actively and passively provided user data elements 51 from a plurality of sources, and to add 52 the user data elements to a data queue. In particular embodiments, Web Service Module 50 receives communications from users accessing a website generated by system 10/92 via client computers 32/92, and updating their profile or performing other actions. The Web Service Module 50 also has an API that can be used by external systems 53, e.g., communicating with system 10 via administrative application server 28 (FIG. 1) to add data elements to the queue. The Web Service then adds 52 that data element to the Data Queue/Store (Database) 54. Data Store 54 is configured to store the plurality of user facts, a rule set, and an execution plan set, as discussed hereinbelow.

Data Queue Manager Module 56 reads the queue and begins processing 58 each data element 51 in the queue based on the source and creates user facts that are stored in fact table. User facts and the fact table are referenced herein interchangeably at 60. Optionally, each type of user fact 60 (e.g. ways we work best, skills, recognitions, etc.) may be further processed based on a set of pre-defined algorithms, before being sent 62 to Data Store 54 for subsequent data mining.

Cache Management Engine 42 is configured to detect when changes are made to the rule set and to the execution plan set, and to store updated cached copies of a rule set 72 and execution plan set 70, wherein the updated cached copies are accessible by Inferential Data Mining Module 44 independently of the Data Store 54 to facilitate efficient multi-threaded processing for each one of a plurality of users. Cache Management Engine 42 thus provides a continuous cache management process to maximize efficiency. Since the Execution Plans 70 and rules 72 don't change very frequently, in particular embodiments they are retrieved once and stored in cache to minimize I/O requests and improve performance. The engine 42 detects when a change is made and updates the cache accordingly. In many embodiments, user and other data-rich elements are also cached to minimize trips to the database 54 for frequently used data elements (e.g., Users' Name, photo, etc.)

This caching is thus used to keep infrequently changed data ready for quick access by the newsfeed system. When changes do occur, the Cache Management Engine 42 refreshes the data in memory to make the latest data readily available. This includes data for execution plans, rules, users, celebrations, and quotes. The cache is configurable, e.g., to allow administrators to set expiration times on data, force the system to refresh and update, and use locks/mutex to update data that could be in use. As discussed in greater detail hereinbelow, the multi-threading nature of the newsfeed allows execution plans 82 to run in parallel multi-threaded fashion which runs threads for each user to run the rules that apply to them thus increasing the efficiency and speed of the execution relative to conventional approaches.

Inferential Data Mining Engine 44 includes aspects that differ significantly from conventional publish/subscribe systems. In particular, Data Mining Engine 44 utilizes a rules-based mechanism to process the facts gathered in the database 54 as described hereinabove, and generates newsfeed posts specific to each user. It does this by utilizing a series of rules 80 and execution plans 82.

In particular embodiments, rules 80 include one or more of the following:
  Source: dropdown list of data sources that the system supports.
  Match with: a list of options on how to perform the match for this rule. The options provided here will be dependent on the source/type of data.
  Proximity: a list of proximity options (company-wide, department, office location, group, custom filters).
  Feed Mode: a list of options on the type of post to generate (e.g. single user, aggregate view, etc.). The options are dependent on the source selected.
  Display Template: a list of options for the template to use when displaying the post. The options are dependent on the feed mode selected and the platform used by the particular recipients.
  Hold Days: number of days to wait before activating this rule for each user.
  Lookback days: number of days to look back when querying in the fact table.

In particular embodiments, execution plans 82 include one or more of the following parameters:
  Plan Name
  Frequency: Continuous, Daily, Weekly, Monthly, Scheduled Time, On Demand.
  Priority: the priority for the execution plan
  Mode: First rule to succeed, Random, All. 'First rule to succeed' is determined by whether content was found for a particular rule called by the Execution Plan. 'Random' and 'All' adjusts based on scale of organization, for example, 'All" executes all rules in the execution plan sequentially and returns a post for each one that succeeds. With the 'Random' execution plan, the order of the rules is executed randomly until one succeeds.
  List of rules: the admin can order the rules and choose whether the next step is to be based on a prior rule's success/failure.

In addition, particular embodiments use an overarching prioritization layer (not shown) may be applied based on the size of the company/organization. This prioritization layer assures that the value of micro-universes for individuals remains high, taking into account the scale of the company/organization they are operating in. For example, in a company of 100 people, in addition to the content of their team, department and office colleagues being of real value, the content of individuals across the whole company is likely to be of interest and valuable to the individual. Alternatively, in a company of 5000 employees, the specific content of individuals whose only connection to the user is that they are working in the same company, would likely be much less valuable and less interesting relative to the value of content from colleagues in their teams, other groups they interact with, departments and office. The prioritization layer allows these embodiments to de-prioritize the "company only" connections relative to other items that will appear in the user's newsfeed.

The Inferential Data Mining Engine 44 runs through each execution plan 82 in a multi-threaded process for each user, then processes each rule in the execution plan to create the posts based on the rule configuration and the data in the fact tables for that user and source. The outcome of this process is a list of posts for each user, e.g., in a JSON (JavaScript Object Notation) format. It should be noted that by use of this approach, one user fact has the potential of creating many feeds based on the particular rules and the execution plans. The engine 44 prioritizes these potential feeds based on the administrator's configurations, as discussed hereinbelow.

The Inferential Data Mining Engine 44 is thus configured to access and apply the updated cached copies of execution plans 82 and rule sets 80 to the user facts 60, to inferentially generate newsfeed posts by identifying commonalities among the plurality of users, wherein the Data Mining Engine 44 runs through each execution plan in a multi-threaded process for each user, and processes each rule within the context of the execution plan to enable Newsfeed Generation Engine 46 to generate newsfeed posts 88.

Newsfeed Generation Engine 46 allows system 10/98 to create a customizable newsfeed 100 for each newsfeed item with variations depending on aggregation and proximity. As used herein, 'aggregation' refers to matching users based on various commonalities as discussed herein, while 'proximity' refers to closeness of users to one another based on various factors including organizational structures of groups (e.g., employers) with which the users are affiliated. Newsfeed Generation Engine 46 is configured to apply one or more customizable newsfeed templates 86 for various platforms to each newsfeed post 88, to generate newsfeeds 100 for the various delivery formats/platforms (e.g., website, mobile, Outlook, etc.). In particular embodiments, administrators of system 10/98 have the ability to apply and change templates 86 and test different delivery formats at any time, e.g., via Web Service Module 50. In operation, when a user accesses a newsfeed 100, e.g., by logging onto a Newsfeed page generated by system 10/98, the Newsfeed Generation Engine 46 parses the posts 88 that have been generated for that user, applies the template for those posts 88 and forwards it on the client machine 32/92 for display. In addition, or as an alternative, system 10/98 may apply the template to posts for particular users, and then push the newsfeeds 100 to users via email or other suitable electronic communication method. Moreover, it should be noted that as part of the multi-threaded processing discussed hereinabove, particular embodiments run multiple instances of Newsfeed Engine 46 simultaneously, for efficiency and to allow the system 10/98 to scale as needed.

In these embodiments, the Inferential Data Mining Engine 44 thus mines the Data Store 54 for a determination of which user facts 60 should be used to create the newsfeed posts 88, and of which users 45 should be designated as subscribers to the newsfeed posts. It should thus be noted that these designated users had not previously 'subscribed' to the newsfeed posts, e.g., in the manner associated with conventional newsfeed systems. As such, these users are referred to herein as 'unsubscribed system users'. It should also be recognized that this determination by the system takes place independently of individual users' direct actions such that neither the particular posts 88, nor the subscribers thereto, are predefined, but rather are inferentially defined by the Data Mining Module 44 based on inferred relationships between users 45 and content within the user data of which the individual users may be unaware.

It should be recognized that in a conventional newsfeed system, a user's action directly affects the content of their newsfeed. For example, if user A posts information or a news article, all users that subscribe to user A will get a direct post on their newsfeed. Therefore, every action performed by a user A triggers newsfeed items to be posted to other users. This contrasts with the present embodiments, in which posts and entries made by individual users are stored into fact tables 60 which Data Mining Engine 44 then mines to enable Newsfeed Generation Engine 46 to produce newsfeed posts that the system inferentially determines to be of interest to particular users 45. In these embodiments, publishers and subscribers are not predefined, rather, once the system 10/98 generates the post, the system then determines which users will receive them, i.e., the system determines which users will effectively be the 'subscribers' by inferring their interest based on an analysis of these users' profiles, etc. The system may also effectively determine the identity of the 'publisher', since in some cases, the publisher is the system itself, e.g., in the event system 10/98 reveals relationships between people and content that users are not even aware of.

In addition, the newsfeed content generated by the present embodiments is not limited by the timing of data supplied by users. As described above, system 10/98, e.g., Data Mining Engine 44, mines the data in Database 54 substantially continuously looking for connections, relationships, and items that can tie users 45, groups, or teams to one another, and then generates content for particular users based on the mined data. This continuous mining of data allows the system to generate newsfeeds even during a period of user inactivity. The data mining engine 44 may also find connections and relevant content to post on the newsfeed from a collection of data that was entered in the past (possibly from a long time ago) that just became relevant as a result of a new person joining the company, a new user's uploaded profile data, or a longtime user updating their profile. Embodiments of the invention are thus configured to infer a connection in the future as new data arrives, e.g., a new connection may be inferred based on new information applied to the collection of older (historical) data. This new information, when added to the accumulated historical data, may thus generate a new connection that would not have been apparent prior to capture of the new information.

Figure 6:
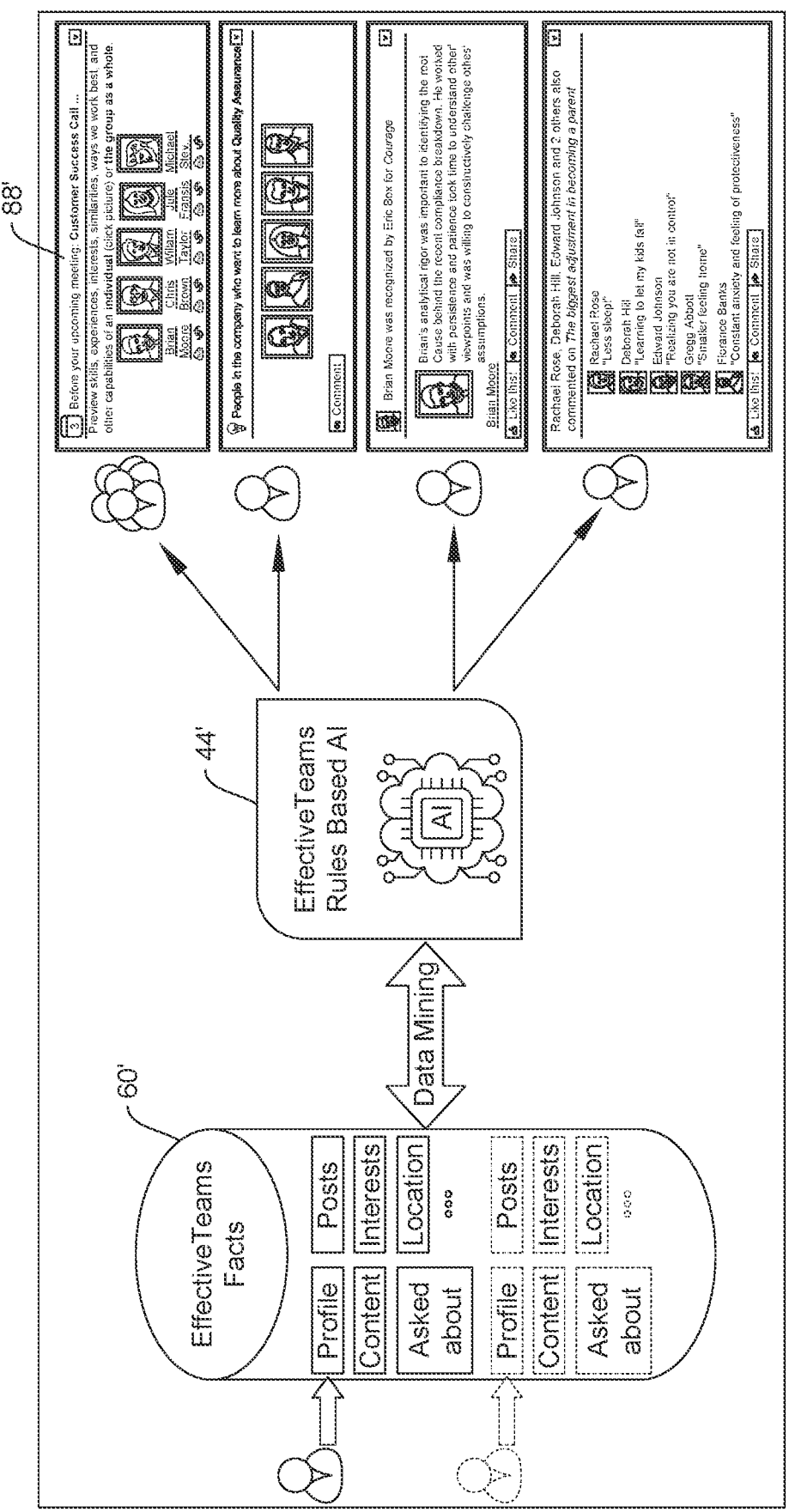
FIG. 6 is a block diagram of an alternate embodiment of the present invention.

Turning now to FIG. 6, in particular embodiments of the present invention, Inferential Data Mining Engine 44' uses artificial intelligence algorithms, (e.g., in combination with Newsfeed Generation Engine 46, FIG. 5) to create valuable information for users, as shown at 88'. For example, newsfeed outcomes/posts 88' (FIG. 5) may be generated with user facts 60' that are not the result of direct user input, but rather were obtained from the aggregation and mining of the entire dataset of database 54. In one representative embodiment, the system mines data to suggest possible mentors. Rather than simply matching on a topic (e.g., suggesting people who are willing to be asked about "financial modeling" to people who want to learn about "financial modeling"), system 10/98 incorporates additional fields of data (e.g. values, what someone thinks makes a difference, etc.) that would contribute to more successful mentoring relationships. These embodiments then offer that curated list of possible mentors to users at 88'.

The system may thus generate the list of possible mentors by searching for people with at least some predetermined number of positive indicators (see examples of positive indicators below). The people with the highest number of positive indicators will be included in the results.

Examples of positive indicators:
  Wants to be asked about a topic that the current user is interested in learning more about;
  Has selected "Likes to see others do well" in What makes a difference;
  Has selected certain values;
  Has selected "Mentoring" in What I like to do;
  Has a certain % of similarities with the current user; and
  Is in the same office location as current user.

The positive indicators may be ranked and weighted and may be configurable, e.g., by an administrator.

Figure 7:
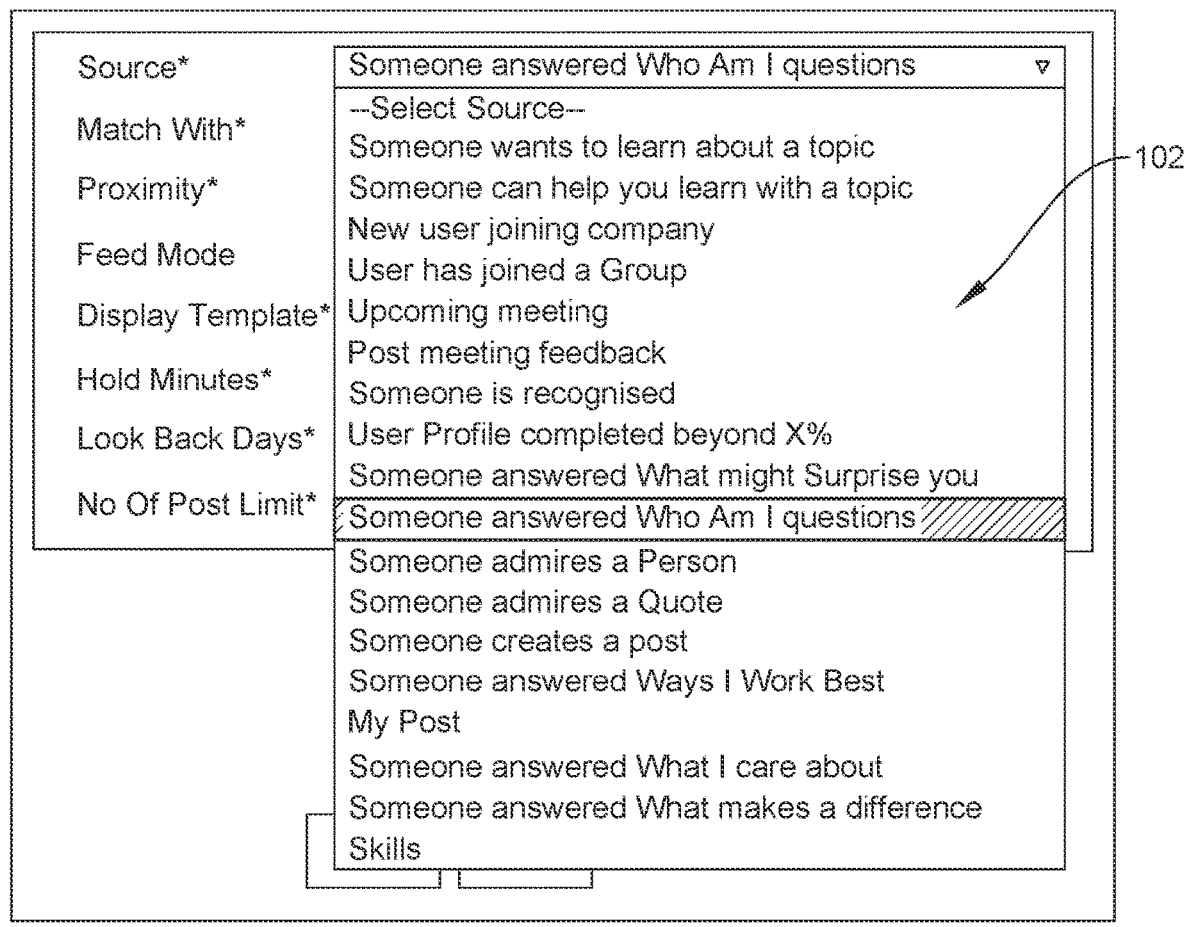
FIG. 7 is an image displayed to administrators of embodiments of the present invention.

Turning now to FIG. 7, the foregoing embodiments are configured to use actively and passively provided user data elements 60, 60', which include one or more of the following source types 102: skills; who I am questions; ask and learn about; ways we work best; what might surprise you; what I love to do; what makes a difference; quotes I admire; people I admire; recognitions; skills; recognitions; someone wants to learn about a topic; someone can help you learn a topic; new user joining company; user has joined a group; upcoming meeting; post meeting feedback; someone is recognized; user profile completed beyond x %; someone answered 'what might surprise you'; someone answered 'who am I questions; someone admires a person; someone admires a quote; someone creates a post; someone answered 'ways I work best'; my post; someone answered 'what I care about'; someone answered 'what makes a difference'; and/or combinations thereof. These user data elements 60, 60' may be captured from any number of sources, including the aforementioned user entries/responses to questions, and user resumes, etc.

Referring now to FIGS. 8 and 9, the Data Store is configured to store any number of rule sets/rules 80 associated with any one or more of the aforementioned user data source types, in combination with rules parameters including one or more of: match with; proximity; display templates; hold minutes; look back days; number of post limit; and/or combinations thereof.

As shown in FIG. 10, in particular embodiments, the Data Store is configured to store one or more execution plans 82 including a plurality of rules 80 arranged to execute in any user-defined order. As shown in FIGS. 11 and 12, the system may be configured to identify commonalities among one or more users including similarities between any one or more of the aforementioned source types, such as similar responses to a question 104 (FIG. 11) by groups of users 106 (FIG. 12).

Referring to FIGS. 13 and 14, the Newsfeed Engine 46 is configured to apply one or more customizable newsfeed templates for various platforms including website, mobile, email, and combinations thereof, to each newsfeed post, to generate newsfeeds for the various platforms associated with particular identified users. As shown at 108, 110, the system selects templates for platforms suitable to users matched to a particular source type. As shown at 112 in FIG. 15, Newsfeed Engine 46 is also configured to generate newsfeeds for the various platforms with variations depending on aggregation and proximity. Aggregation and proximity can be set at Company, department, office location, group, matching on a particular answer or selection.

Referring back to FIG. 5, a representative method in accordance with embodiments of the present invention includes a method for generating and publishing relevant newsfeeds to unsubscribed system users. This exemplary method includes:
  (a) capturing, with Web Service Module 50, actively and passively provided user data elements 51 from a plurality of sources, and adding 52 the user data elements to a data queue in a data store 54;
  (b) reading and processing, with a Data Queue Manager Module 56, the data queue and each of the user data elements, e.g., based on one or more source types (FIG. 7) to generate a plurality of user facts 60, 60';
  (c) storing, with a Data Store 54, the plurality of user facts 60, 60', rules 72, and execution plans 70;
  (d) detecting, with a Cache Management Module 42, when changes are made to the rules and to the execution plans, and storing updated cached copies of the rules and execution plans, wherein the updated cached copies are accessible by an Inferential Data Mining Module 44, 44' independently of the Data Store 54 to facilitate efficient multi-threaded processing for each one of a plurality of users;
  (e) accessing and applying, with the Inferential Data Mining Module 44, 44', the updated cached copies of the execution plan and rule set 70, 72 to the user facts 60, 60', to inferentially generate newsfeed posts 88 by identifying commonalities among the plurality of users, wherein the Data Mining Module 44, 44' is configured to run through each execution plan in a multi-threaded process for each user, and to process each rule within the context of the execution plan to generate the newsfeed posts;
  (f) applying 86, with a Newsfeed Generation Engine 46, one or more customizable newsfeed templates for various platforms to each newsfeed post, to generate newsfeeds 100 for the various platforms;

wherein the modules are processed by one or more computer processors; and wherein the Inferential Data Mining Module 44, 44' mines the Data Store for a determination of which user facts 60, 60' should be used to create the newsfeed posts, and of which users should be designated as subscribers to the newsfeed posts, said determination taking place independently of individual users' direct actions such that neither the particular newsfeed posts, nor the subscribers thereto, are predefined, but rather are inferentially defined by the Data Mining Module based on relationships between users and content of which the users may be unaware.

Figure 16:
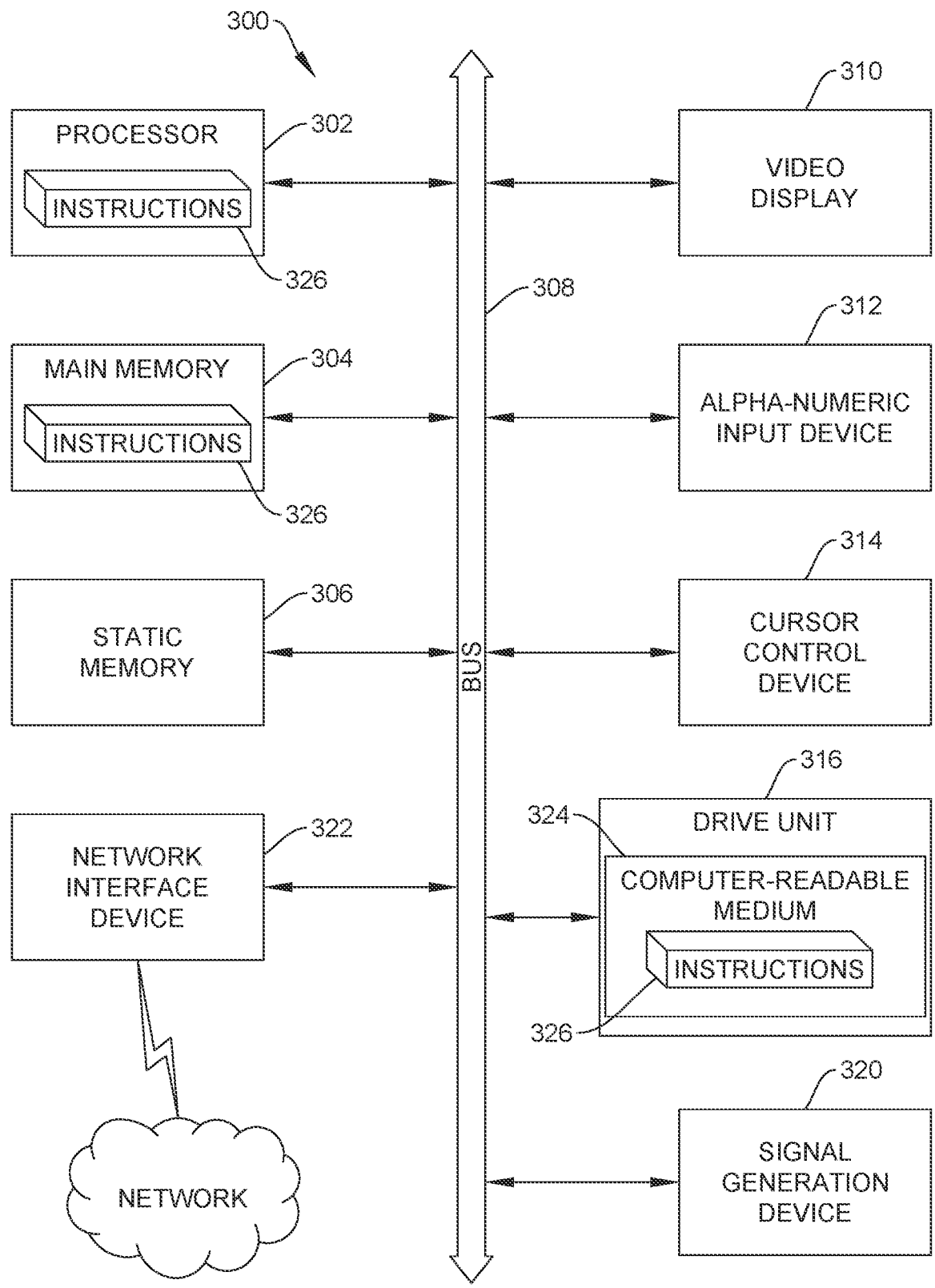
FIG. 16 is a block diagram of one embodiment of a computer system usable with embodiments of the present invention.

FIG. 16 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine. The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention, and as further described hereinbelow.

Embodiments of the present invention also relate to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible, non-transitory, computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), any other appropriate static, dynamic, or volatile memory or data storage devices, or other type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. It should be further understood that any of the features described with respect to one of the embodiments described herein may be similarly applied to any of the other embodiments described herein without departing from the scope of the present invention. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Various systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims. It

Having thus described the invention, what is claimed is:

1. A system for generating and publishing relevant newsfeeds to unsubscribed system users, the system comprising:
   a processor; and
   a memory configured to store modules executable by the processor, the modules comprising:
   a Web Service Module to capture actively and passively provided user data elements from a plurality of sources, and to add the user data elements to a data queue;
   a Data Queue Manager Module to read the data queue and to process each of the user data elements to generate a plurality of user facts;
   a Data Store to store the plurality of user facts, rules, and execution plans;
   a Cache Management Module to detect when changes are made to the rules and to the execution plans, and to store updated cached copies of the rules and the execution plans, wherein the updated cached copies are accessible by an Inferential Data Mining Module independently of the Data Store to facilitate efficient multi-threaded processing for each of a plurality of users;
   the Inferential Data Mining Module to access and apply the updated cached copies of the execution plans and rules to the user facts, to inferentially generate newsfeed posts by identifying commonalities among the plurality of users, wherein the Inferential Data Mining Module runs each execution plan in a multi-threaded process for each user, and processes each rule within the context of the execution plan to generate the newsfeed posts;
   a Newsfeed Generation Module to apply one or more newsfeed templates for various platforms to each newsfeed post, to generate newsfeeds that are formatted for the various platforms;
   wherein the Inferential Data Mining Module mines the Data Store for a determination of which user facts to use to create the newsfeed posts, and of which users to designate as subscribers to the newsfeed posts, said determination taking place independently of individual users' selecting an item so that the newsfeed posts and subscribers thereto are inferentially defined by the Data Mining Module based on relationships between users and/or inferences obtained from the user facts to form a hierarchically flat communication system.

2. The system of claim 1, wherein the actively and passively provided user data elements include: skills; responses to who I am questions; ask and learn about; ways we work best; what might surprise you; what I love to do; what makes a difference; quotes I admire; people I admire; recognitions; someone wants to learn about a topic; someone can help you learn a topic; new user joining company; user has joined a group; upcoming meeting; post meeting feedback; someone is recognized; user profile completed beyond x %; someone answered 'what might surprise you'; someone answered 'who am I questions; someone admires a person; someone admires a quote; someone creates a post; someone answered 'ways I work best'; my post; someone answered 'what I care about'; someone answered 'what makes a difference'; and/or combinations thereof.

3. The system of claim 2, wherein the plurality of sources include user entries, resumes, and/or combinations thereof.

4. The system of claim 2, wherein the Data Store is stores a plurality of rules associated with one or more of said user data elements.

5. The system of claim 4, wherein said plurality of rules further comprise rules parameters selected from the group consisting of: match with; proximity; display templates; hold minutes; look back days; number of post limit; and/or combinations thereof.

6. The system of claim 4, wherein the Data Store is stores one or more execution plans including said plurality of rules arranged to execute in a predetermined order.

7. The system of claim 1, wherein the commonalities among the plurality of users include similarities between any one or more of the plurality of user facts.

8. The system of claim 1, wherein the Newsfeed Generation Module applies one or more customizable newsfeed templates for a plurality of platforms including website, mobile, email, and combinations thereof, to each newsfeed post, to generate newsfeeds that are formatted for individual ones of the plurality of platforms associated with particular identified users.

9. The system of claim 8, wherein the Newsfeed Generation Module generates newsfeeds for the plurality of platforms with variations depending on aggregation and proximity parameters, said aggregation and proximity parameters being selectable based on company, department, office location, group, matching of particular user facts, and/or combinations thereof.

10. A method for generating and publishing relevant newsfeeds to unsubscribed system users, the method comprising:
   (a) capturing, with a Web Service Module actively and passively provided user data elements from a plurality of sources, and adding the user data elements to a data queue;
   (b) reading and processing, with a Data Queue Manager Module, the data queue and each of the user data elements to generate a plurality of user facts;
   (c) storing, with a Data Store, the plurality of user facts, rules, and execution plans;
   (d) detecting, with a Cache Management Module, when changes are made to the rules and to the execution plans, and storing updated cached copies of the rules and the execution plans, wherein the updated cached copies are accessible by an Inferential Data Mining Module independently of the Data Store to facilitate efficient multi-threaded processing for each of a plurality of users;
   (e) accessing and applying, with the Inferential Data Mining Module, the updated cached copies of the execution plans and rules to the user facts, to logically inferentially generate newsfeed posts by identifying commonalities among the plurality of users, wherein the Inferential Data Mining Module runs each execution plan in a multi-threaded process for each user, and processes each rule within the context of the execution plan to generate the newsfeed posts;
   (f) applying, with a Newsfeed Generation Module, one or more newsfeed templates for various platforms to each newsfeed post, to generate newsfeeds for the various platforms;
   wherein the modules are processed by one or more computer processors; and
   wherein the Inferential Data Mining Module mines the Data Store for a determination of which user facts to use to create the newsfeed posts, and of which users to designate as subscribers to the newsfeed posts, said determination taking place independently of individual users' selecting an item so that the newsfeed posts and subscribers thereto are inferentially defined by the Data Mining Module based on relationships between users and/or inferences obtained from the user facts.

11. The method of claim 10, wherein the actively and passively provided user data elements include: skills; responses to who I am questions; ask and learn about; ways we work best; what might surprise you; what I love to do; what makes a difference; quotes I admire; people I admire; recognitions; someone wants to learn about a topic; someone can help you learn a topic; new user joining company; user has joined a group; upcoming meeting; post meeting feedback; someone is recognized; user profile completed beyond x %; someone answered 'what might surprise you'; someone answered 'who am I questions; someone admires a person; someone admires a quote; someone creates a post; someone answered 'ways I work best'; my post; someone answered 'what I care about'; someone answered 'what makes a difference'; and/or combinations thereof.

12. The method of claim 11, wherein the plurality of sources include user entries, resumes, and/or combinations thereof.

13. The method of claim 11, wherein said storing (c) further comprises storing a plurality of rules associated with one or more of said user data elements.

14. The method of claim 13, wherein said plurality of rules further comprise rules parameters selected from the group consisting of: match with; proximity; display templates; hold minutes; look back days; number of post limit; and/or combinations thereof.

15. The method of claim 14, wherein the Data Store stores one or more execution plans including said plurality of rules arranged to execute in a predetermined order.

16. The method of claim 10, wherein the commonalities among the plurality of users include similarities between any one or more of the plurality of user facts.

17. The method of claim 10, wherein said applying (f) further comprises applying, with the Newsfeed Generation Module, one or more customizable newsfeed templates for a plurality of platforms including website, mobile, email, and combinations thereof, to each newsfeed post, to generate newsfeeds that are formatted for individual ones of the plurality of platforms associated with particular identified users.

18. The method of claim 17, further comprising generating, with the Newsfeed Generation Module, newsfeeds for the plurality of platforms with variations depending on aggregation and proximity parameters, said aggregation and proximity parameters being selectable based on company, department, office location, group, matching of particular user facts, and/or combinations thereof.

19. An article of manufacture for monitoring software code being executed in a target processor having a bus and cache, said article of manufacture comprising:
- a non-transitory computer readable medium having a computer readable program code embodied therein, said computer usable medium having computer readable program code for:
- (a) capturing, with a Web Service Module actively and passively provided user data elements from a plurality of sources, and adding the user data elements to a data queue;
- (b) reading and processing, with a Data Queue Manager Module, the data queue and each of the user data elements to generate a plurality of user facts;
- (c) storing, with a Data Store, the plurality of user facts, rules, and execution plans;
- (d) detecting, with a Cache Management Module, when changes are made to the rules and to the execution plans, and storing updated cached copies of the rules and the execution plans, wherein the updated cached copies are accessible by an Inferential Data Mining Module independently of the Data Store to facilitate efficient multi-threaded processing for each of a plurality of users;
- (e) accessing and applying, with the Inferential Data Mining Module, the updated cached copies of the execution plans and rules to the user facts, to inferentially generate newsfeed posts by identifying commonalities among the plurality of users, wherein the Inferential Data Mining Module runs each execution plan in a multi-threaded process for each user, and processes each rule within the context of the execution plan to generate the newsfeed posts;
- (f) applying, with a Newsfeed Generation Module, one or more newsfeed templates for various platforms to each newsfeed post, to generate newsfeeds for the various platforms;
- wherein the modules are processed by one or more computer processors; and wherein the Inferential Data Mining Module mines the Data Store for a determination of which user facts to use to create the newsfeed posts, and of which users to designate as subscribers to the newsfeed posts, said determination taking place independently of individual users' selecting an item so that the newsfeed posts and subscribers thereto, are inferentially defined by the Data Mining Module based on relationships between users and/or inferences obtained from the user facts.

* * * * *